(No Model.)

E. T. POLLARD.
CIGARETTE MACHINE.

Patented Dec. 11, 1894.

Fig. 1.

Witnesses:
Sidney P. Hollingsworth
Guy E. Davis

Inventor.
EDWARD T. POLLARD,
by his attorneys,
Baldwin Davidson & Wight (No Model.) 7 Sheets—Sheet 2.

E. T. POLLARD.
CIGARETTE MACHINE.

No. 530,718. Patented Dec. 11, 1894.

Witnesses:

Inventor.
EDWARD T. POLLARD
by his attorneys, (No Model.) 7 Sheets—Sheet 3.

E. T. POLLARD.
CIGARETTE MACHINE.

No. 530,718. Patented Dec. 11, 1894.

Witnesses:

Inventor.
EDWARD T. POLLARD,
by his attorneys (No Model.)  7 Sheets—Sheet 4.

E. T. POLLARD.
CIGARETTE MACHINE.

No. 530,718.  Patented Dec. 11, 1894.

Fig. 7.

Witnesses:  
Sidney P. Hollingsworth  
Guy E. Davis Inventor.  
EDWARD T. POLLARD  
by his attorneys,  
Baldwin Davidson & Wight (No Model.) 7 Sheets—Sheet 5.

E. T. POLLARD.
CIGARETTE MACHINE.

No. 530,718. Patented Dec. 11, 1894.

Witnesses:

Inventor.
EDWARD T. POLLARD
by his attorneys (No Model.) 7 Sheets—Sheet 6.

E. T. POLLARD.
CIGARETTE MACHINE.

No. 530,718. Patented Dec. 11, 1894.

Witnesses:

Inventor.

EDWARD T. POLLARD,
by his attorneys,

(No Model.) 7 Sheets—Sheet 7.

E. T. POLLARD.
CIGARETTE MACHINE.

No. 530,718. Patented Dec. 11, 1894.

Witnesses:

Inventor.
EDWARD T. POLLARD
by his attorneys

UNITED STATES PATENT OFFICE.

EDWARD T. POLLARD, OF NEW YORK, N. Y.

CIGARETTE-MACHINE.

SPECIFICATION forming part of Letters Patent No. 530,718, dated December 11, 1894.

Application filed March 16, 1894. Serial No. 503,909. (No model.)

*To all whom it may concern:*

Be it known that I, EDWARD T. POLLARD, a citizen of the United States, residing in the city, county, and State of New York, have invented certain new and useful Improvements in Cigarette-Machines, of which the following is a specification.

My invention more especially relates to that class of cigarette machines in which fibrous or shredded tobacco, in a flocculent or loose condition, is fed into the machine, combed or drawn out in an even layer or mass with its fibers parallel, and delivered to mechanism which forms it into a continuous filler, incloses that filler in a gummed or pasted wrapper, and cuts the continuous cigarette thus formed into suitable lengths for smoking.

The object of my invention is to secure a machine which shall perform these operations efficiently, rapidly, and successfully, which end I attain by employing certain new and improved devices, or organizations of instrumentalities hereinafter fully set forth and claimed.

In order to carry out the objects of my invention, I arrange, in a suitable casing or hopper, endless aprons lying one above the other, and moving in the same direction, but with the lower one projecting beyond the other, the drawing and combing rolls which take the loose, fibrous tobacco fed upon the first apron therefrom, partially comb out its fibers, and deliver it to the other apron, from which it is taken by similar rolls, and discharged through the mouth of the casing or hopper, laterally upon an endless filler-carrying belt, moving longitudinally across, and close to the lower side of the delivery or discharge-roll, which throws the tobacco upon the belt transversely to its line of movement, the motion of the belt subsequently turning the fibers parallel with said line of movement, to present them properly to the filler-forming devices.

The above-described feed-mechanism is that which I prefer, but its organization may be varied without impairing the efficiency of its operation, so long as the fibers are thrown laterally upon the belt by a discharge-roll or equivalent device. A pressing-belt, moving at the same speed and in the same direction as the carrying-belt, and a short distance above it, gradually approximates it so as to press vertically upon the filler. These belts are preferably flat in cross-section, composed of flexible, but resilient material, such as steel for instance, and are hoop-shaped or ovoid in outline, each being positively and directly driven in an upright or vertical circuit or path by friction-rollers, preferably of elastic material, such as rubber or gutta percha. The lower or carrying-belt is loose, untrammeled, or unsupported except by its driving-rollers and by suitable guides or supports around or over which it passes in that portion of its circuit in which it co-operates in forming the filler. The upper belt is similarly organized and operated, and travels in a guide-groove in the casing just above the mouth or discharge-opening, and passes under or around a hinged guide held down by a latch. This guide causes a downward deflection of the pressing-belt upon the filler on the carrying belt, to compress it vertically. The release of this guide allows the belt readily to be removed in case of choking or obstruction at that point. A flexible or yielding abutment, bearing against the outer edges of the carrying and pressing belts, on that side opposite the feed, prevents the lateral escape of the tobacco thrown between the belts by the feed or delivery mechanism. A narrow belt of flexible, resilient material, such as steel, curved in cross-section, with its concave side toward the filler, is arranged to work diagonally between the carrying and pressing-belts, so as to compress the tobacco laterally to aid in forming the filler. The wrapper passes from a reel, mounted on a vertical axis, through a fixed guide between the above-mentioned abutment and the edges of the carrying and pressing belts, whence it passes through a second fixed guide against which the diagonal belt above-mentioned presses the filler. The wrapper moves and is presented to the filler with its edge vertical, instead of flatwise, as usual. Paste is applied to the inner, upper edge of the wrapper, while passing through the guide, but before being bent or folded around the filler.

A series of endless belts, preferably of flexible, resilient material, such as steel, and concavo-convex in cross-section, are arranged edgewise and parallel with each other, passing around suitable driving or carrying wheels. These belts normally move parallel with each other, with their concave sides toward the filler, which latter, with its wrapper, after being pasted, passes between these belts and the diagonal compressing-belt before mentioned. During this passage, a guide acting on the folding-belts causes them to converge laterally and overlap each other, so as gradually to fold the wrapper laterally around the filler. During the first part of this movement, a separator prevents the pasted edge of the wrapper from coming in contact with the unpasted edge, or with the filler, but afterward a suitable guide turns up the lower or unpasted edge of the wrapper, and another guide turns or folds the pasted edge downward upon the unpasted edge, and a rubbing or smoothing device completes the formation of the continuous cigarette, which is then cut into suitable lengths by proper mechanism.

The accompanying drawings show all my present improvements, embodied in a cigarette machine in the best way now known to me. Some of said improvements may, however, be used without the others, and in machines differing, to some extent, in their details of construction, from those herein shown. Unless otherwise indicated, the parts are of usual approved construction.

That side of the machine from which the tobacco is fed I term the rear; the opposite side, the front. The feed-end of the machine I term the left; the opposite end, the right.

Unfeathered darts indicate the direction of movement of certain parts of the mechanism.

Fig. 3$^a$, a similar section, on an enlarged scale, showing the details of the discharge-roll, carrying and pressing belts, and abutment; Fig. 8 is a rear view in elevation, showing the same parts as the preceding figure, in connection with the wrapping guides and carrying and pressing belts. Fig. 11 is a rear view in perspective, showing, on an enlarged scale, the separator which prevents the two edges of the wrapper from coming in contact until after passing this point. Figs. 12 and 13, respectively, represent in perspective, details of other sections of the wrapper-folding mechanism, and Fig. 14, a similar view of the final smoothing section. Figs. 15 to 23, both inclusive, are respectively vertical cross-sectional views on the correspondingly numbered lines of Fig. 8, showing the relative attitudes assumed by the various parts in forming the filler, pasting the wrapper, and folding it on the filler; the respective attitudes shown being as follows: Fig. 25, a left-end view, in elevation, showing the feed-driving mechanism, and Fig. 26, a right-end view in elevation, also showing another portion of the driving-gear.

The tobacco-feeding mechanism is shown as mounted mainly in a feed-frame A, which extends backward from the left-hand or feed-end of the main frame A'. Loose, fibrous or shredded tobacco is spread, as usual by hand, upon an upper or first endless apron B, carried by suitable rollers $b$, $b'$, and moving inward toward the front of the machine. A second or lower endless apron B', carried by rollers $b^3$, $b^4$, extends forward, beyond the upper one, and moves in the same direction, but at an increased speed, to prevent tobacco accumulating thereon.

A combing-roll C, revolving over the inner end of the upper apron B, combs the tobacco therefrom over a bridge $b^2$, while a drawing-roll C', takes the tobacco from the combing-roll, and throws it upon the second apron B'. A second roll $C^2$, combs the tobacco on this apron over a bridge $b^5$, upon a discharge-roll $C^3$, which throws the tobacco laterally upon an endless carrying-belt D.

Figure 3:
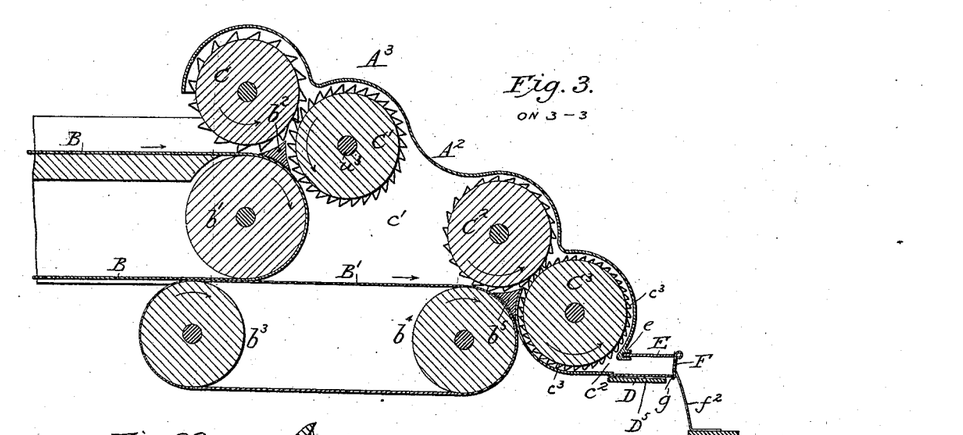
Fig. 3 is a vertical, cross-sectional view through the feed-mechanism, on the line 3—3 of Fig. 2, looking toward the right or discharge-end of the machine.
Figure 3A:
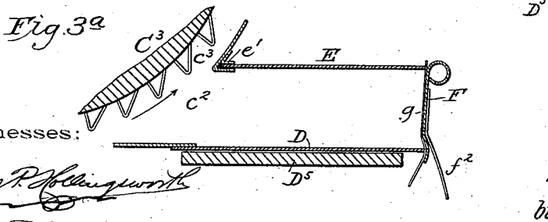

The aprons B, B', are provided with suitable side-guards to prevent lateral escape of tobacco therefrom. The rolls C, C', $C^2$, $C^3$, are likewise provided with side-guards $c$, $c'$, and with a removable cover or shield $A^2$. The side guards and cover constitute a hopper A³, in which the rolls and aprons are inclosed. All these rolls C, C′, C², C³, are covered with suitable carding or teeth c³, preferably of the form shown in Fig. 3ª. These rolls, as well as the endless aprons B, B′, all move in the same direction, but at different speeds.

The second combing-roll C², rotates much faster than the first one, C, while the discharge-roll C³, makes three revolutions to two of the drawing-roll C′. While the relative speed of these rolls may be varied if desired, the proportions given have produced good results in practice.

The carrying-belt D is preferably composed of elastic, flexible, or resilient material, preferably of steel, and is about two and a half inches wide. The belt is flat in cross-section, but of an ovoid contour or outline, circumferentially, and rotates in a substantially vertical path, parallel with, and slightly to one side of the discharge-roll C³, which throws the tobacco laterally thereon, through a horizontal slot or mouth c², on the outer side of the casing or hopper, near its bottom. This belt runs between and is actuated by driving-rollers D′, D², preferably having elastic, or resilient surfaces or coverings, such as rubber or gutta-percha.

An upper endless pressing-belt E, similar in material, organization, and operation to the carrying-belt D, but preferably about half an inch narrower, is arranged to run directly over it, in the same vertical plane, being actuated by driving-rollers E′, E². The inner edge of this belt runs in a horizontal guideway e, in the casing, just over the discharge-slot or mouth c², (see Figs. 3ª and 5,) which guide causes the belt to run directly above and parallel with the lower one, and with the face of the discharge-roll C³. After passing beyond this roll, this upper belt is deflected slightly downward, (see Fig. 5,) by a curved guide E³, around which it runs, so as to compress vertically the tobacco passing between it and the lower carrying-belt D, to form the filler. This tobacco, by the way, it will be observed, is thrown laterally between the belts D, E, by the discharge-roll C³, with its fibers cross-wise of the belts, but their motion turns the fibers quickly lengthwise of the belts and continues them in that position until discharged therefrom.

The guide E³, is shown in the form of a bent arm or lever, movable vertically on a pivot e′, but is normally held in place by a latch e², on an arm e³, turning horizontally on a pivot e⁴. (See Fig. 4.) In case of the belts choking, unlatching the guide enables the obstruction readily to be removed.

The carrying-belt D, moves over a suitable bed or guide, D⁵, (Fig. 5,) while carrying the filler, but is otherwise unsupported or untrammeled, except by its driving-rollers D′, D². The pressing-belt E is likewise unsupported or untrammeled except by its driving-rollers E′, E², and guides e, E³, which act while the belt is in contact with the filler. These belts may therefore be run rapidly and with but little friction, the pressure of the yielding abutment F, upon the edges thereof being very slight.

The wrapper g, wound in a continuous strip as usual, is mounted on a reel G, turning on an upright axis, and consequently passes edgewise or vertically instead of flatwise or horizontally around or through a curved guide f, secured in a fixed position upon an upright f′, opposite the left end of the discharge-roll C³, and thence across the face of an abutment F, mounted on spring-supports f², f², in such manner as to cause it to press against the front or outer edges of the carrying and pressing belts D and E, pressing, however, more strongly against the lower belt than the upper one, in order to prevent the lateral escape of the tobacco therefrom. This abutment is shown in Fig. 3ª as slightly curved at the bottom, to insure close contact of the wrapper and lower belt, and also with a bead at the top simply to secure a round edge instead of a sharp one. It will be seen from this figure that the upper edge of the wrapper, which is interposed between the abutment and the edges of the belts, projects slightly above the upper or pressing-belt E, while its lower edge extends some distance below the lower or carrying-belt D. This arrangement facilitates the subsequent folding of the wrapper, besides preventing the escape of the tobacco.

A narrow endless belt h, preferably of steel and about the width of the diameter of the cigarette to be formed, runs diagonally between the upper and lower belts D, E, around driving-wheels H, H′, of comparatively large diameter. The belt h is concavo-convex in cross-section, its concave side being the outer one, and annular grooves are formed in the edges of the driving-wheels H, H′, conforming thereto. This belt h also traverses a fixed, curved, grooved guide H², (Fig. 6) interposed between the belts D and E, and the driving-wheels H, H′. The organization is such that the belt h lies and moves diagonally between the carrying and pressing belts D, E, from rear to front, so as gradually to compress the tobacco between them into a filler. This compression, however, does not take place against the yielding abutment F, but against a second fixed wrapper-guide I. The yielding abutment F, terminates a short distance beyond the right end of the discharge-roll C³, leaving a short space or opening f³, between it and the fixed guide I, in crossing which the wrapper-strip is unsupported. (See Figs. 4 and 6.) This fixed or second wrapper-guide I is mounted on an upright I′, opposite the diagonal compressing or filler-forming belt h, and the left-hand portion of its fixed guide H², and is adjustable laterally relatively to these parts by usual means, such as a slot and set-screw i⁴. (See Fig. 4.) In entering this guide, the wrapper-strip passes over a lip or projection $i'$, which serves, in connection with the opening $f^3$, to smooth out the wrapper, and prevent its wrinkling.

Figure 6:
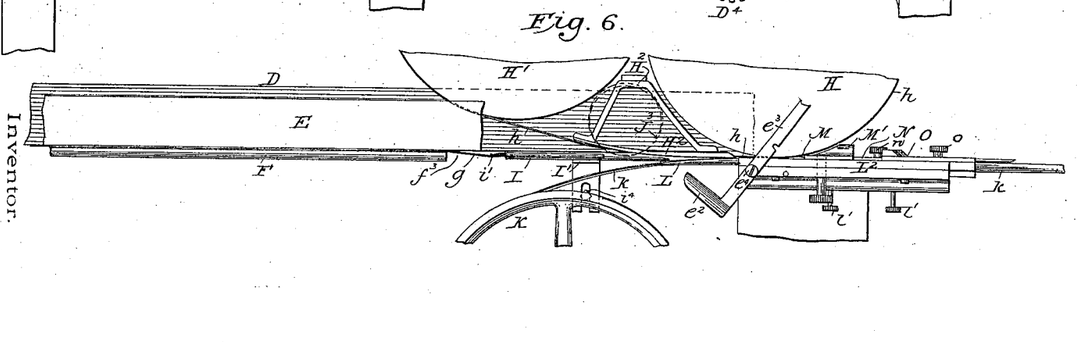
Fig. 6, a plan view of the above-mentioned parts, together with the laterally-converging folding-belts and wrapping-guides.
Figure 7:
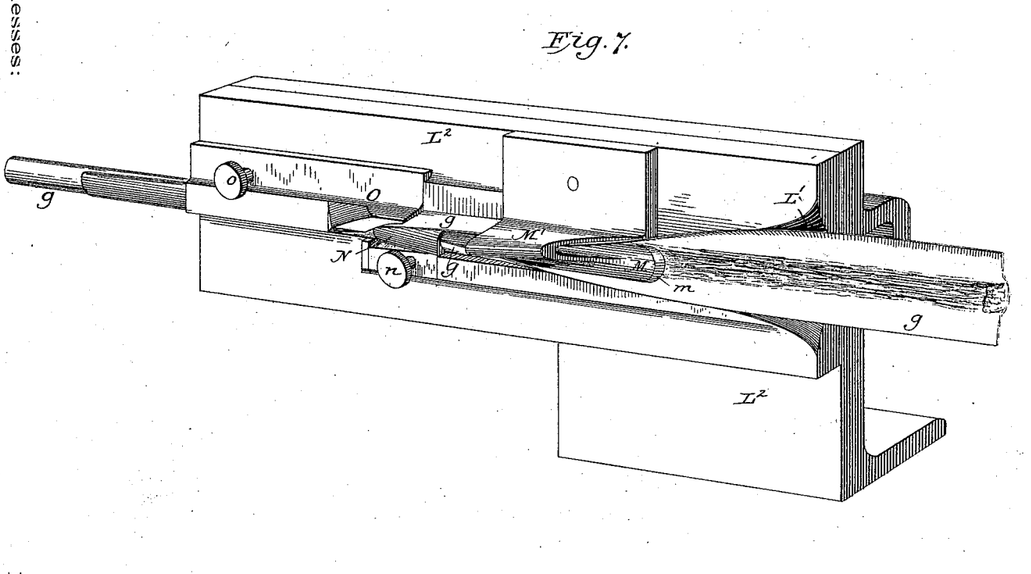
Fig. 7, a perspective view from the back, showing the rear or inner side of the folding or wrapping-guides.
Figures 8, 11, 12, 13, 14:
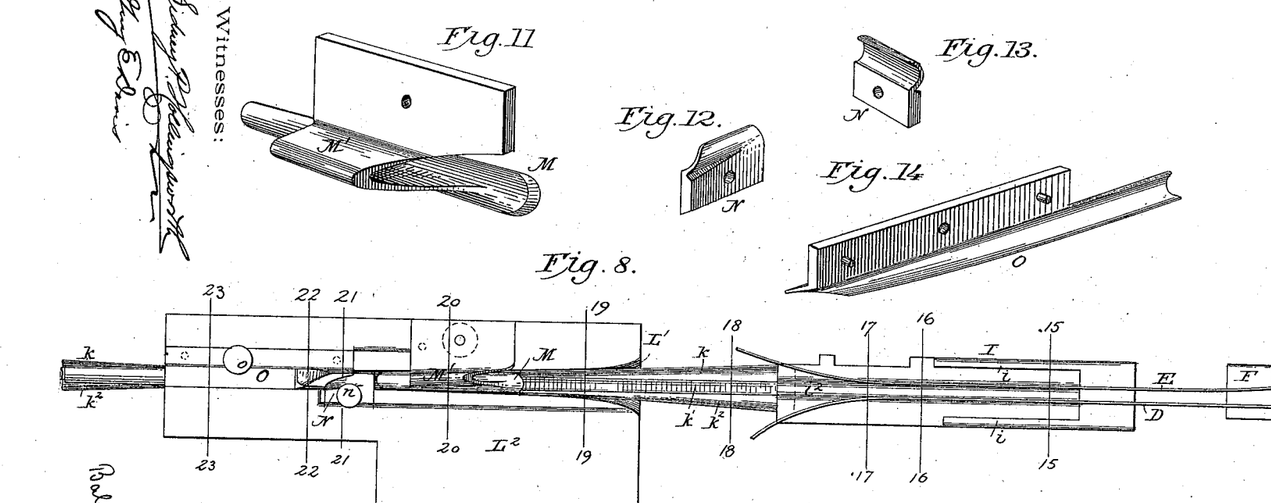
Figure 9:
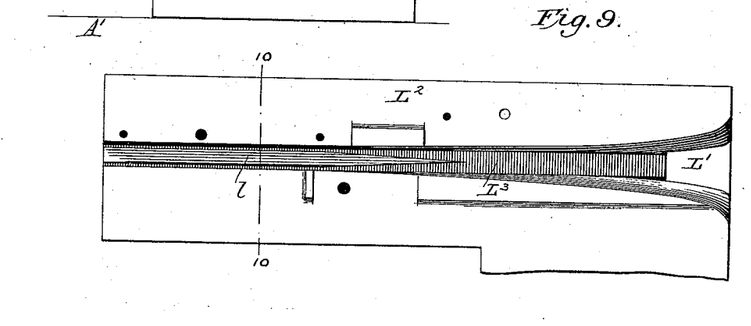
Fig. 9 is a similar view with parts removed to show the details of the devices for varying the size of the cigarette.
Figure 10:
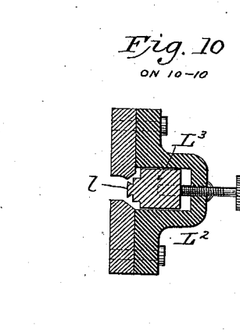
Fig. 10, a vertical cross-sectional view of the same parts, on the line 10—10 of the preceding figure.
Figure 15:
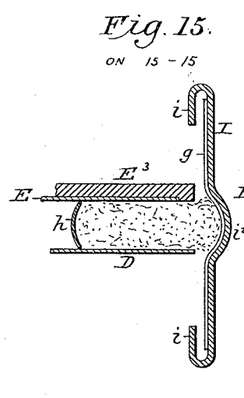
Fig. 15 shows the diagonal belt interposed between the carrying and pressing belts as compressing the filler laterally against the second or fixed wrapper-guide.

The wrapper-guide I, unlike the abutment F, is wider than the wrapper, and provided with curved, overlapping edges, $i$, the edges of the wrapper traveling in the grooves thus formed. A central longitudinal groove or outward bulge $i^2$, in the wrapper-guide aids in shaping the filler, which is compressed vertically at this point, between the upper and lower carrying and pressing belts D, E, and forced laterally against the wrapper-guide I, by the diagonal compressing or filler-forming belt $h$, (Figs. 6 and 15.) The curved edges of the wrapper-guide terminate shortly before the nearest approximation of the guide to the diagonal compressing-belt $h$, but straight edges of the guide extend still farther back, and terminate at a point where the curving or folding devices hereinafter mentioned come into play.

Figures 4, 5:
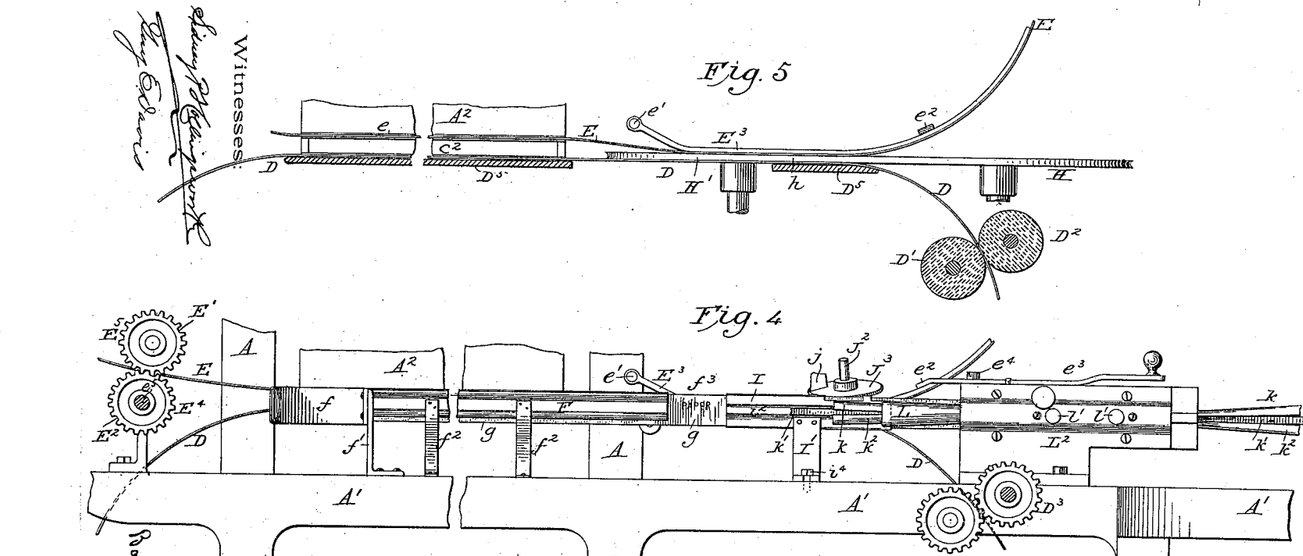
Fig. 4, a front view in elevation, on an enlarged scale, showing details of portions of the filler-forming mechanism, wrapper-guides, pasting-devices, and wrapping-devices.
Fig. 5, a similar view of the carrying and pressing belts and interposed, diagonal, laterally-compressing or filler-forming belt.
Figure 16:
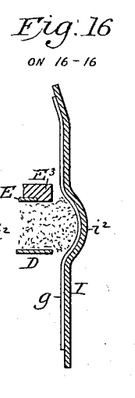
Fig. 16 shows the form of this wrapper-guide just before the wrapper is pasted.
Figure 17:
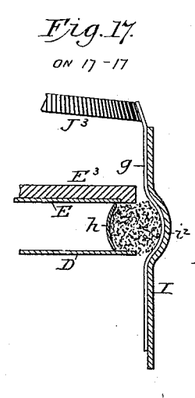
Fig. 17, the position of the parts at the moment of pasting the wrapper.

The gumming or pasting device is shown in Figs. 1, 2, 4 and 24, as consisting of a horizontal paste-cylinder J, arranged slightly above, but diagonal to the path of the wrapper, and pivoted on an upright shaft $z$, so as to be adjustable horizontally around it. A screw-shaft or piston J', actuates a plunger in the paste-cylinder, in a way hereinafter more fully described. A shaft $J^2$, slightly inclined to the perpendicular, carries on its lower end a paste-wheel $J^3$, the edge of which runs in a slot in the bottom of the paste-cylinder, and takes the paste therefrom. A scraper $j$, acting on the upper face of the paste-wheel, removes surplus paste. The paste-wheel $J^3$, applies the paste on its edge to the inner, upper side of the still unbent wrapper-strip, as it passes across a notch or opening in the straight upper edge of the wrapper-guide I, near its rear end, (Fig. 4.) This edge, however, is slightly inclined inward laterally, to insure the proper application of the paste. (See Figs. 16 and 17.) The relation of these parts is also shown in Fig. 4, and the position of the paste-wheel is also indicated in dotted lines in Fig. 6. The carrying and pressing belts D, E, diverge vertically at this point, leaving the filler compressed laterally by the diagonal belt $h$, against the wrapper, and the rear end of its fixed guide I.

Figure 1:
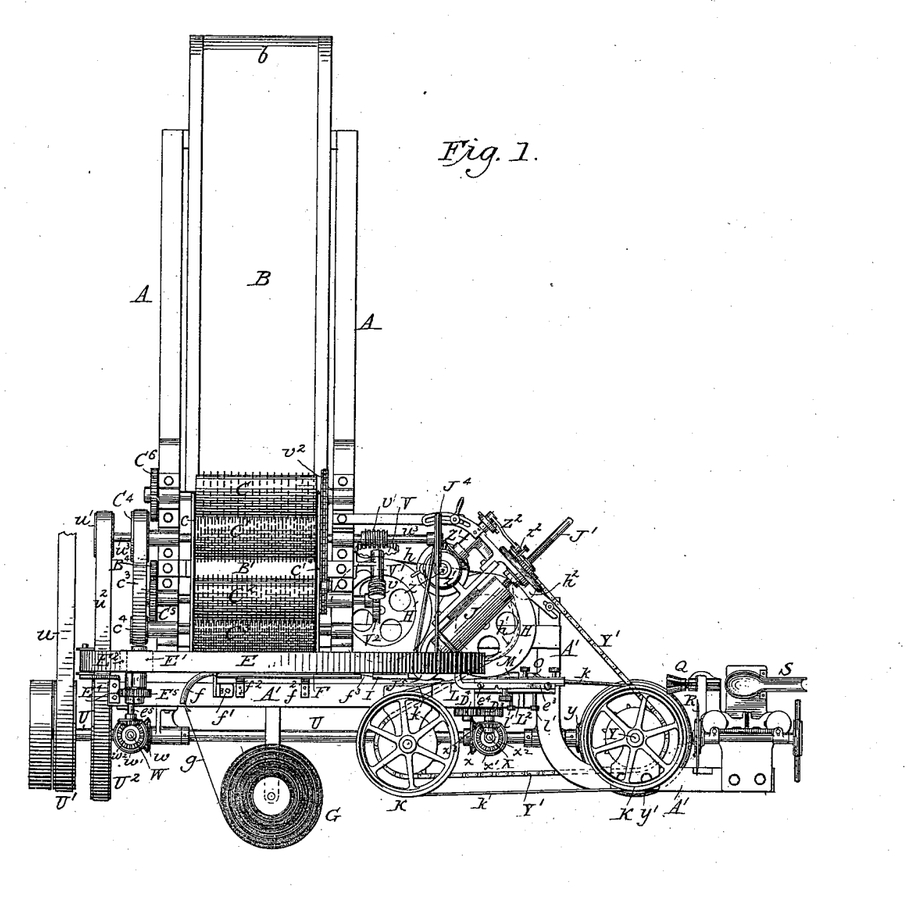
Figure 1 represents a plan view of the machine with the cover of the hopper removed.
Figure 2:
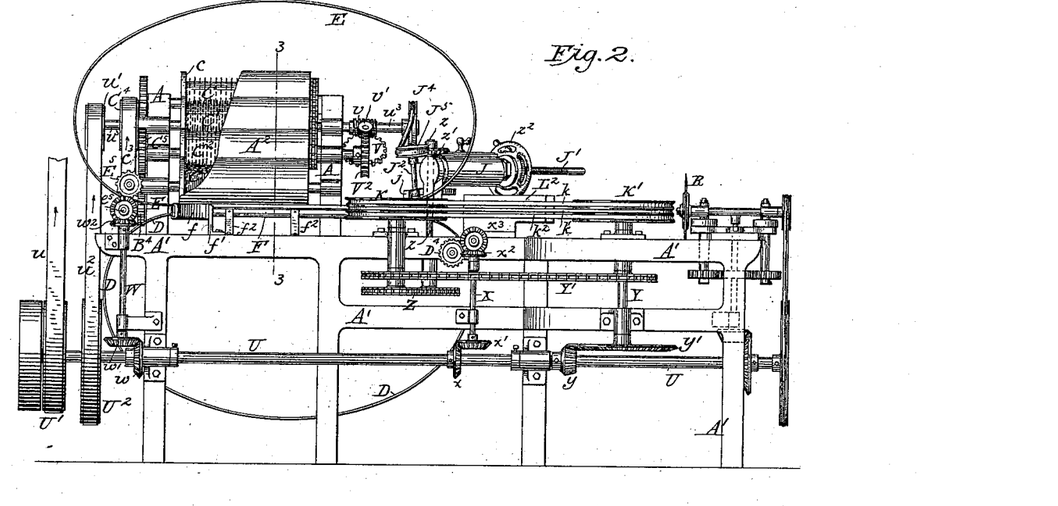
Fig. 2, a front view in elevation, thereof. The remaining views are on an enlarged scale.

A series of endless folding-belts $k$, $k'$, $k^2$, are shown as mounted on horizontal, annularly-grooved carrying-wheels K, K', arranged parallel with, and in the horizontal plane of the diagonal compressing-belt $h$, but on the opposite side of the filler therefrom. These belts are narrow, preferably of steel, and concavo-convex in cross-section, with their concave sides toward the filler. The central one, $k'$, is shown as somewhat narrower than the opposing diagonal compressing-belt $h$, and is curved in the arc of a circle of about the diameter of the cigarette to be formed. The outer forming-belts $k$, $k^2$, are shown as nearly twice as wide as the central belt, their inner edges being straight or but slightly curved, their outer ones being more curved. (See Fig. 18.) These belts are so organized that, while normally running parallel with, but slightly separated from each other during the greater portion of their circuit, as shown in Fig. 2, the outer ones may be caused to overlap each other, and the central one, while moving in contact with the filler and wrapper, by sliding relatively to each other, as hereinafter explained; that is, the central folding-belt always remains opposed, during a certain portion of its movement, to the diagonal compressing-belt $h$, while the outer ones move over it toward each other. The three belts $k$, $k'$, $k^2$, traverse certain devices hereinafter described, to fold the pasted wrapper upon the filler, and complete the formation of the continuous cigarette. These devices comprise several sections detachably secured in position by fastenings admitting of their ready removal, replacement, or adjustment. The first or front section L, (Figs. 4, 6, 7, 8 and 18,) is curvilinear in cross-section, gradually tapering or converging from left to right, so as to cause the outer folding-belts gradually to overlap the inner or center one $k'$, while still projecting laterally beyond it so as to bend the wrapper-strip laterally around the filler, both above and below. The edges of the wrapper, in this position in fact overlap both the compressing-belt $h$, and its carrying-wheel H'. The rear or right-hand edge of the fixed wrapper-guide I, overlaps the front or left-hand edge of this belt-converger L, the folding belts passing between them at this point. This belt-converger is continuous with a groove L', formed in a guide-block $L^2$. It in fact constitutes a continuous belt-converger, although shown as made in two parts for convenience of construction, operation, and adjustment. A tongue-shaped cam $l$, lying centrally in the forward side of this groove, is mounted on a block $L^3$, adjustable laterally by set-screws $l'$, so as to vary the overlapping of the folding-belts, and consequently the size of the cigarette.

Figures 18, 19:
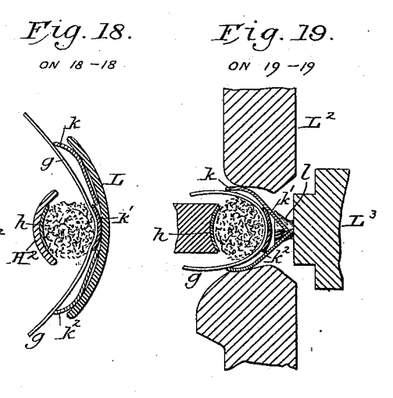
Fig. 18, the position after the divergence of the carrying and pressing belts, and when the folding-belts are coming into action.
Fig. 19 shows the converging and overlapping of the folding-belts, when the wrapper is about half folded around the filler.
Figure 20:
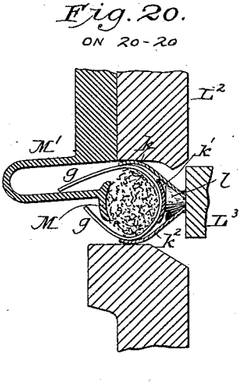
Fig. 20 shows the wrapper as still further folded on opposite sides of the separator, to prevent contact with its gummed edge.
Figure 21:
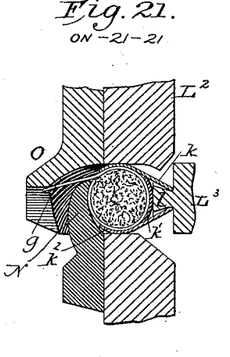
Fig. 21, the position of the parts when the unpasted side of the wrapper is folded upon the filler, after passing beyond the separator.
Figure 22:
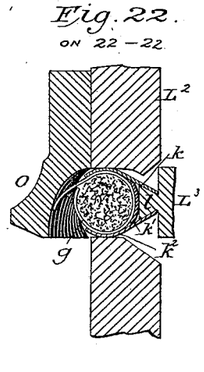
Fig. 22 illustrates the operation of folding the pasted edge upon the unpasted edge of the wrapper.
Figure 23:
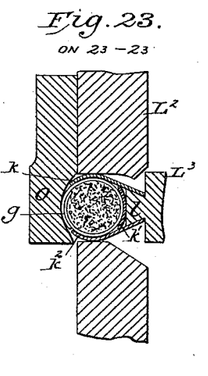
Fig. 23 shows the operation as completed.
Figure 24:
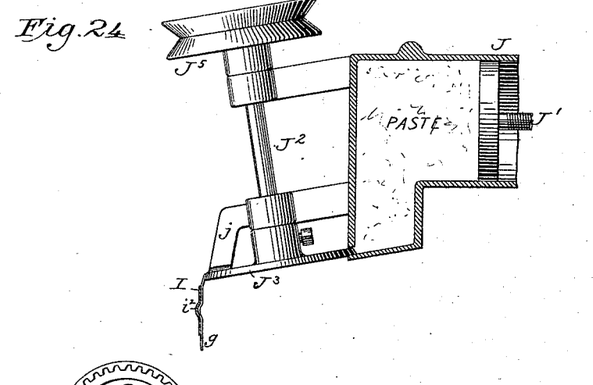
Fig. 24 shows a vertical cross-sectional view of the pasting mechanism, looking to the left.

Fig. 18 shows the relative position of the parts at the point of closest approximation of the compressing-belt $h$, and its guide $H^2$, with the folding-belts $k$, $k'$, $k^2$, and converging-guide L. Fig. 19 shows the relation of these same parts, just before the compressing-belt $h$ begins to diverge from the folding-belts, and while the latter are passing through the narrower portion of the converger or folding-guide, just before the cam or tongue $l$, begins to act on the outer folding-belts, $k$, $k^2$.

Just about the point where the compressing-belt $h$ begins to diverge, its place is supplied by a bar M, concave on its inner side and mounted on a U-shaped, curved support M', secured to the guide-block. (See Figs. 6, 7, 8, 11 and 20.) The front edge of this bar is sharpened to constitute a scraper $m$ which removes any tobacco adhering to the belt $h$.

Its main body or bar lies opposite the folding groove or guide L', and like it tapers gradually from front to rear. It serves to prevent the lateral expansion of the filler, and also separates the pasted and unpasted edges of the wrapper, (see Fig. 20,) these edges being pressed more closely around the filler than in the position shown in Fig. 19, by the action of the tongue $l$, upon the outer folding-belts $k$, $k^2$.

A concave guide N, which I term an upturner, is secured upon the guide-block $L^2$ by a set screw $n$, opposite its folding-groove, and just far enough back of the rear edge of the separator M, to allow the lower edge of the paper to pass between them, and be folded upward. This guide is arranged with its rear edge nearer the central line of the filler than its front edge, gradually to fold and turn up the under edge of the paper. This up-turner is clearly shown in Figs. 7, 8, 12, 13, 21 and 22. These two last-named figures illustrate the way in which this up-turning and folding of the wrapper upon the filler is effected by the co-operation of this up-turner with the folding-belts, the outer ones of which are caused more closely to embrace the filler and wrapper by the gradual widening of the cam-tongue $l$.

A down-folding guide and smoother O, in the form of a grooved bar with its concave side toward the filler, is secured upon the guide-block, just behind the up-turner by a set-screw $o$, a slight opening being left between them for the passage of the upper side or pasted edge of the wrapper, which, by the action of this folder, is gradually turned down upon the under edge of the wrapper, thus bringing the two edges in contact. (See Figs. 7, 8, 14, 22, and 23.) The increased width of the cam-tongue $l$, at this point, causes the folding-belts to slide over the central one laterally, simultaneously compressing and smoothing the wrapper on the top, bottom, and front sides, while the rear or pasted side is smoothed by the action of the tail-end of the down-folding guide, at which point the continuous cigarette emerges in a finished condition. After passing beyond the guide-block $L^2$, the folding-belts resume their normal position. The finished, continuous cigarette passes from the rear end of the smoothing or finishing devices, without intermediate support into a tubular holder Q, during its passage through which it is cut into proper lengths by a rotating-knife R, and the completed cigarettes drop into a receptacle or discharge-spout S.

The particular cutting-apparatus herein shown is so organized as to cause the cigarette-holder and cutter both to move laterally relatively to the line of movement of the finished cigarette to facilitate rapid cutting. This particular apparatus, however, constitutes no part of the subject-matter herein claimed, being the subject of another application for United States Letters Patent filed by me simultaneously herewith, Serial No. 503,908. There are, moreover, various well-known forms of cutting apparatus readily applicable to, and capable of useful operation in connection with my improved cigarette-forming mechanism.

I will now describe the mechanism by which the various moving parts are actuated.

Figures 25, 26:
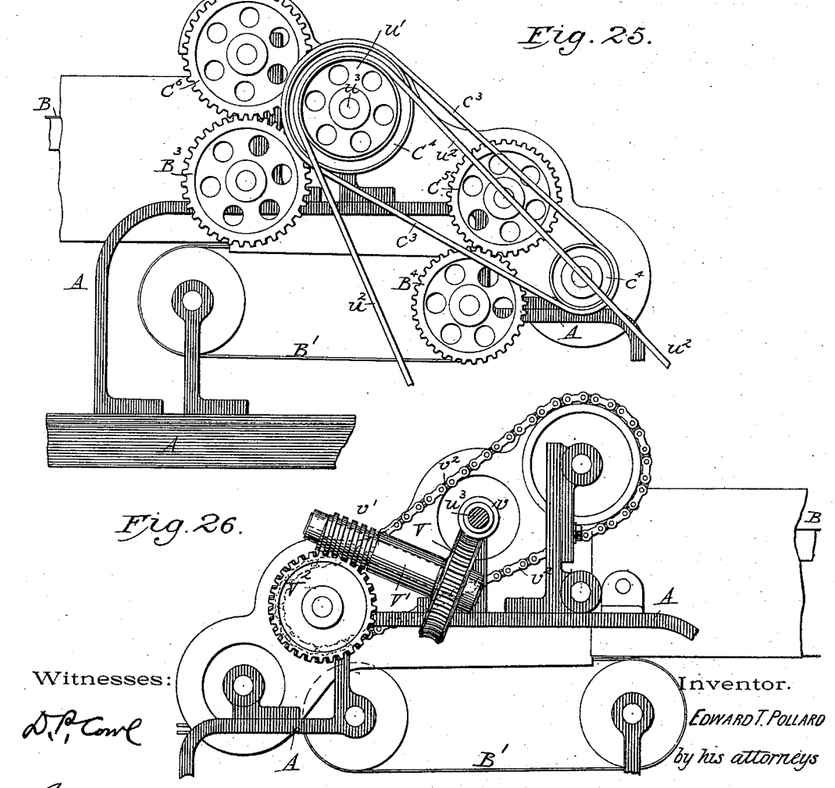

A driving-shaft U, mounted in the main frame, is actuated by a band $u$, from any suitable prime-mover, passing over a pulley U', on the left-hand end of the driving-shaft. A pulley $U^2$, carries a belt $u^2$, passing around a pulley $u'$, on a counter-shaft $u^3$, which counter-shaft carries the first combing-roll C'. A band $c^3$, passing around a pulley $C^4$, on the counter-shaft $u^3$, drives a small pulley $c^4$, on the shaft of the discharge-roll $C^3$. The counter-shaft $u^3$, extends to the right of, and beyond the apron-frame A', and carries thereon a worm $v$, gearing with a worm-gear V, on a shaft V', carrying a worm-gear $v'$, meshing with a worm-gear $V^2$, on the shaft of the lower drawing-roll $C^2$. (See Fig. 26.) A spur-wheel $C^5$, on the opposite or left-hand end of this shaft, drives a corresponding gear $B^4$, on the lower feed-roller $b^4$. A sprocket-wheel on the shaft of the roll $C^2$, and on the right side thereof, carries a sprocket-chain $v^3$, driving a corresponding wheel on the shaft of the upper combing-roll C. A spur-gear $C^6$, on the left-hand end of the shaft of this roll, drives a corresponding gear $B^3$, on the front roller $b'$, of the upper apron B. A bevel-gear $w$, on the driving-shaft, meshes with a corresponding gear $w'$, on an upright shaft W, carrying a bevel-gear $w^2$ meshing with the corresponding gear on the shaft $e^5$, of the lower driving-roller $E^2$, which also carries a spur-gear $E^4$, meshing with a corresponding gear $E^5$, of the upper driving-roller E', thus driving the upper belt E, positively, by frictional contact. A bevel-gear $x$, on the driving-shaft actuates a corresponding gear $x'$, on an upright shaft X, carrying a bevel-gear $x^2$, meshing with a corresponding gear $x^3$, on the shaft of the upper driving-roller $D^2$. A spur-gear $D^3$, on this shaft, drives a corresponding gear $D^4$, on the shaft of the lower driving-roller D', by which means the lower carrying-belt D, is in like manner positively driven by frictional contact. A bevel-gear $y$, on the driving-shaft U, engages a corresponding wheel $y'$, on an upright shaft Y, on the upper end of which one of the wheels K', which carry the folding-belts, is mounted. A sprocket-wheel on the shaft Y, carries a sprocket-chain Y', which passes around a pulley on the shaft of the other carrying-wheel K, and around a sprocket-pulley $h'$, on the driving-wheel H, carrying the diagonal compressing-belt $h$. This sprocket-chain then passes around a tension-pulley $h^2$, and back to its pulley on the shaft Y. A sprocket-wheel on the shaft of the carrying-wheel K, drives a sprocket-chain Z, actuating a sprocket-pulley on an upright shaft $z$. A bevel-gear $z'$, on the upper end of the shaft $z$, drives a corresponding gear on a horizontal shaft Z', carrying on its outer end a crank Z², actuating the pawl $z^2$, of a ratchet carried by a nut actuating the screwed stem J', of the paste-plunger to force the paste from the cylinder in a well-known way.

The paste-wheel proper is driven by a belt from a pulley J⁴, on the rear end of the counter-shaft $u^3$, which belt passes around a corresponding pulley J⁵, on the shaft J², of the paste-wheel J³. The cutting-mechanism is also actuated from the main shaft by gearing shown in the drawings, not necessary here to be described, as it constitutes no part of the subject-matter herein claimed.

I will now describe the operation of the mechanism. As hereinbefore explained, the loose, fibrous tobacco is placed by an attendant upon the upper endless apron B, and arranged by the upper combing and drawing rolls C, C', with its fibers parallel with their line of movement, and dropped upon the second apron B', which, moving faster than the other one, spreads the tobacco more evenly. The tobacco is combed from this apron by the roll C², and drawn therefrom by the discharge-roll C³, and thrown between the carrying-belts, with its fibers transverse thereto, but is turned by the movement of the belt so that the fibers lie parallel therewith. The loose filler is first compresed vertically by the upper belt E, and then gradually compressed and forced against the wrapper-guide I, by the diagonal compressing-belt $h$. The wrapper passes from the reel horizontally, but with its edge vertical, through the fixed curved guide $f$, which smooths it out, and then passes around, still in a vertical position, between the yielding abutment F, and the carrying and pressing belts D, E. The filler is carried forward positively by the belts, while the wrapper is also positively actuated or drawn forward by the friction of the folding-belts $k$, $k'$, $k^2$, which, as heretofore explained, come into operation after the filler has been fully compressed laterally against the wrapper-guide I, and while it is gradually being still further compressed by the action of the belt $h$, guide L, and said folding-belts. A positive, even motion, of all the moving parts is thus obtained, and there is no possibility of tobacco dust lodging in or upon the hopper, aprons, or belts, and thus choking the machine. The wrapper is then gummed as hereinbefore explained, folded around the filler, its lower edge being first upturned and the upper one then folded down upon it, and smoothed by the finishing guide. The diverging action of the folding-belts aids materially in smoothing the wrapper simultaneously with its folding, so that the main function of the finishing guide is to rub the pasted edge smoothly down upon the unpasted one. The finished continuous cigarette passes from the finishing guide to the tubular holder, is cut into suitable lengths by the cutter, and discharged from the machine as before explained.

It will be observed that under my improved organization, the filler is formed by belts moving continuously in the same direction and at the same speed; that the wrapper is fed positively at the same speed by the belts, which aid in folding the wrapper around the filler, and that the wrapper always accompanies the filler from the moment its formation begins, though only partially in contact with it until the filler is formed and its folding is completed. I am thus enabled to run the machine at a high rate of speed, and secure good and quick work.

I claim as of my own invention—

1. A device for feeding loose, fibrous or shredded tobacco in cigarette machines, comprising a casing or hopper having a lateral mouth or discharge opening, a discharge roll working therein, a belt moving edgewise across the mouth of the hopper, substantially in the same horizontal plane as the bottom of the discharge roll, which throws the tobacco directly and laterally thereon, and an abutment between which and the mouth of the hopper the belt is arranged to move.

2. A device for feeding loose, fibrous or shredded tobacco in cigarette machines, comprising a casing, endless aprons arranged one above the other, and moving continuously in the same direction, in the same vertical plane, and the lower one projecting slightly beyond the other, groups of rolls combing or drawing out the fibers from the aprons, a carrying-belt moving across the face of the last roll, which throws the tobacco laterally upon the belt, with its fibers transverse thereto, and an abutment opposite the mouth of the hopper bearing against the outer edge of the belt to prevent the lateral escape of the tobacco therefrom, substantially as hereinbefore set forth.

3. A device for feeding and carrying loose, fibrous or shredded tobacco in cigarette machines, comprising a casing or hopper, devices inclosed therein for combing or drawing out loose, fibrous tobacco fed thereto, a discharge-roll working in the mouth of the hopper, a carrying-belt moving across this mouth and the face of the discharge-roll, which discharge-roll throws the tobacco laterally upon the carrying-belt, a pressing-belt moving over and in the same direction with the carrying-belt, and an abutment against which the opposite edges of both belts work, to prevent the lateral escape of the tobacco therefrom, substantially as hereinbefore set forth.

4. A filler-forming device for cigarette machines, comprising two converging endless belts moving in the same direction, mechanism for discharging tobacco laterally between the belts, and a resilient or yielding abutment bearing against the outer edges of the belts, to prevent the escape of tobacco therefrom, substantially as hereinbefore set forth.

5. A filler-carrying device for cigarette machines, comprising a flexible, resilient hoop or endless belt moving in a vertical circuit without guides or supports except in that portion of its circuit in which it carries the filler, and friction rollers directly and positively driving the belt, substantially as hereinbefore set forth.

6. The hereinbefore described filler-pressing device for cigarette machines, comprising a flexible, resilient hoop or endless belt moving in a vertical circuit, a guide around which it moves while pressing the filler, but unsupported elsewhere, and friction-rollers directly and positively driving the belt, substantially as hereinbefore set forth.

7. A device for vertically pressing the filler in cigarette machines, comprising a flexible, resilient hoop or endless carrying-belt moving in a vertical circuit without guides or supports except in that portion of its circuit in which it carries the filler, a similar flexible, resilient endless pressing-belt moving in a vertical circuit over the carrying belt, a guide around which the pressing-belt moves while pressing the filler, and friction-rollers directly and positively driving each belt, substantially as hereinbefore set forth.

8. A filler-carrying device for cigarette machines, comprising two flexible, resilient hoops or endless belts moving one over the other in a vertical circuit, friction-rollers directly and positively driving the belts, a guide around which one of the belts runs, and a rocking-arm or latch-lever on which the guide is mounted, substantially as hereinbefore set forth.

9. A device for feeding loose, fibrous or shredded tobacco and compressing it vertically, in cigarette machines, comprising two endless converging belts of flexible, resilient material, such as steel, arranged one above the other, in the same vertical plane, friction-gearing actuating them, mechanism for feeding the tobacco laterally between the belts, and a resilient or yielding abutment bearing against the edges of the belts on one side to prevent the lateral escape of the tobacco.

10. A device for feeding a cigarette wrapper longitudinally and vertically or edgewise to the wrapping-devices of a cigarette machine, comprising endless belts arranged one above the other, mechanism for driving them positively in the same direction and at the same speed, a yielding abutment between which and the adjacent edges of the belt the wrapper passes, a fixed guide for the wrapper, and mechanism for drawing or feeding the wrapper positively, at the same speed as the belts, substantially as hereinbefore set forth.

11. A filler-forming device for cigarette machines, comprising converging belts arranged one above the other, mechanism for discharging the tobacco laterally between the belts, an abutment bearing against the edges of these belts opposite the feed side, a compressing or filler-forming belt working diagonally between the converging belts, and a wrapper-guide against which the diagonal belt compresses the tobacco to form the filler, substantially as hereinbefore set forth.

12. A filler-forming and wrapper-applying device for cigarette machines, comprising converging belts arranged one above the other, a compressing or filler-forming belt working diagonally between them, and a fixed wrapper-guide bearing against the edges of the converging belts, to form the filler and compress it against the wrapper, substantially as hereinbefore set forth.

13. A filler-forming, pasting and wrapper-applying device for cigarette machines, comprising converging belts arranged one above the other, a compressing or filler-forming belt working diagonally between them, a wrapper-guide against which the filler is compressed, and mechanism for applying paste to the upper edge of the wrapper, above the belt, before the guide commences its folding action, substantially as hereinbefore set forth.

14. A filler-forming, pasting and wrapper-applying device for cigarette machines, comprising converging belts arranged one above the other, mechanism for feeding the tobacco laterally between them, a yielding abutment bearing against the outer edges of these belts, a compressing or filler-forming belt working diagonally between the converging belts, a wrapper-guide against which this belt compresses the tobacco to form the filler, mechanism for applying paste to the upper edge of the wrapper, above the belt, at the point of convergence of the diagonal belt and wrapper guide, before the folding action commences, and mechanism for moving the belts and wrapper at a uniform speed in the same direction, substantially as hereinbefore set forth.

15. A filler-forming and wrapper-folding device for cigarette machines, comprising laterally-curved, resilient endless belts, normally moving parallel with each other, with mechanism, substantially such as described, which causes them at intervals to converge and overlap each other to fold the wrapper upon the filler.

16. A cigarette-filler forming and wrapping device, comprising a flexible, resilient, laterally-curved endless belt, mechanism for moving it in the line of movement of the filler, a series of flexible, resilient, laterally-curved endless belts normally movable parallel with each other on the opposite side of the filler, mechanism for moving them at substantially the same speed as the opposed belt, and a guide which causes these last-named belts to converge laterally and overlap each other to form the filler and partially enfold it in the wrapper, substantially as hereinbefore set forth.

17. The combination, substantially as hereinbefore set forth, of endless-belts lying one above the other, between which the filler is carried, an endless belt moving diagonally between them, a series of laterally-curved, flexible, resilient endless belts normally moving parallel with each other and the opposed diagonal belt, and a guide which causes the series of belts to converge laterally and overlap to form and wrap the filler.

18. The combination, substantially as hereinbefore set forth, of endless belts lying one above the other, between which the filler is carried, an endless belt moving diagonally between them, a wrapper-guide bearing against the edges of one side of the filler-carrying and pressing-belts, a series of laterally-curved, flexible, resilient endless belts normally moving parallel with the opposed diagonal belt between which last-named belts the wrapper passes, and a guide which causes the series of belts to overlap each other laterally to wrap the filler.

19. The combination, substantially as hereinbefore set forth, of a wrapper-guide, a series of laterally-curved, flexible, resilient endless belts normally moving in a path parallel with that of the filler, a similar belt on the opposite side of the filler, a folding-guide which causes the series of parallel belts to overlap and fold the wrapper upon the filler, and a separator which temporarily prevents contact of the edges of the wrapper.

20. The combination, substantially as hereinbefore set forth, of a series of flexible, resilient endless belts normally moving in parallel paths, a guide which causes them to converge laterally and overlap, and an adjustable tongue or cam in the guide to vary the overlap, and consequently the size of the cigarette formed by them.

21. The combination, substantially as hereinbefore set forth, of a series of flexible, resilient endless belts normally moving in parallel paths, a guide which causes them to converge laterally and overlap to fold the wrapper upon the filler, a separator opposed to these belts, and an up-turner or guide, which folds the unpasted side of the wrapper upon the filler.

22. The combination, substantially as hereinbefore set forth, of a series of flexible, resilient endless belts normally moving in parallel paths, a guide which causes them to converge laterally and overlap, to fold the wrapper upon the filler, another guide which folds the unpasted side of the wrapper upon the filler, and still another guide which folds the pasted edge of the wrapper upon the folded unpasted edge.

23. The combination, substantially as hereinbefore set forth, of a casing or hopper, a belt moving edgewise across its mouth, a wrapper guide at the side or edge of the belt directly opposite the forward end of the mouth of the hopper, and means for discharging the tobacco directly upon the belt between the hopper and guide, for the purposes specified.

24. The combination, substantially as hereinbefore set forth, of a casing or hopper, a belt moving edgewise across its mouth, a wrapper guide, and a yielding abutment opposite the mouth of the hopper, and means for discharging the tobacco directly upon the belt for the purposes specified.

In testimony whereof I have hereunto subscribed my name.

EDWARD T. POLLARD.

Witnesses:
LLOYD B. WIGHT,
B. WASHINGTON MILLER.